H. H. HOLDAWAY AND T. R. GABEL.
PRODUCT PICKING NOZZLE.
APPLICATION FILED JAN. 27, 1917.
1,344,205. Patented June 22, 1920.
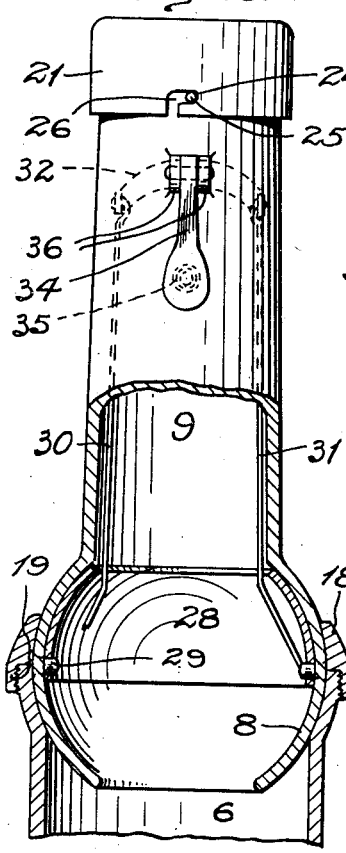
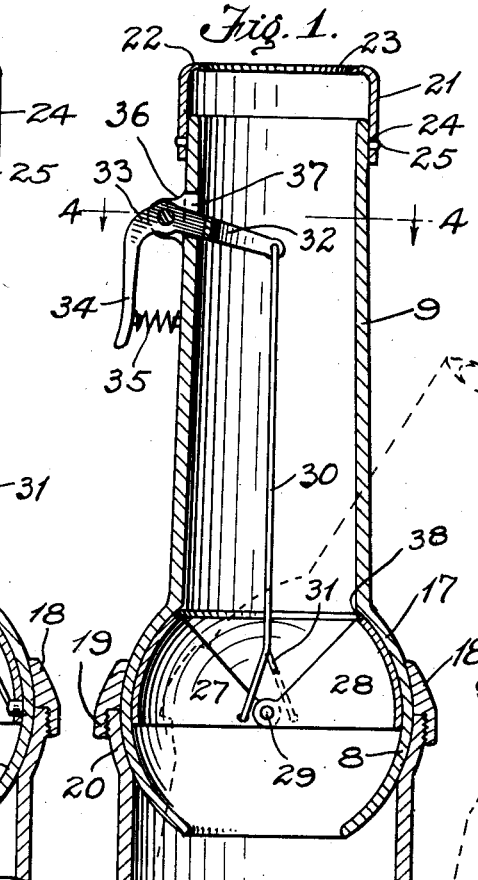
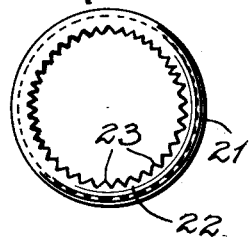
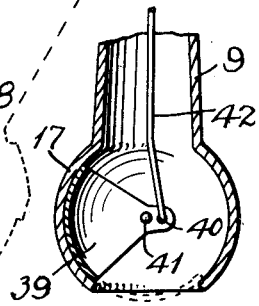
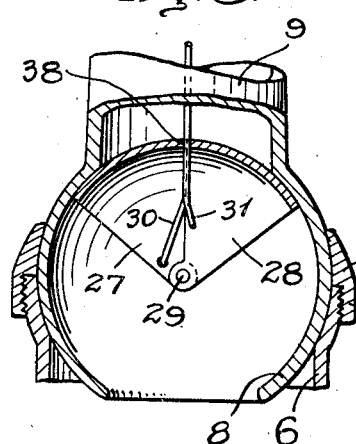
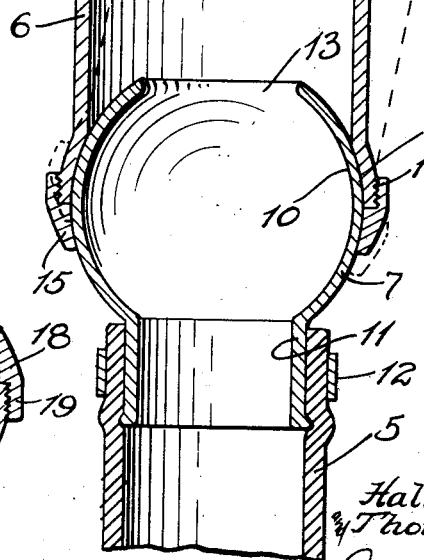
Inventors.
Hall H. Holdaway
& Thomas R. Gabel.
By Cassell Severance
Attorney.
Witness
E. R. Pollard

UNITED STATES PATENT OFFICE.

HALL H. HOLDAWAY AND THOMAS RING GABEL, OF LOS ANGELES, CALIFORNIA, ASSIGNORS OF TWO-THIRDS TO HENRY P. JONES, OF LOS ANGELES, CALIFORNIA, AND ONE-THIRD TO SAID GABEL.

PRODUCT-PICKING NOZZLE.

1,344,205.     Specification of Letters Patent.     Patented June 22, 1920.

Application filed January 27, 1917. Serial No. 145,000.

*To all whom it may concern:*

Be it known that we, HALL H. HOLDAWAY and THOMAS RING GABEL, citizens of the United States, residing at Los Angeles, in the county of Los Angeles and State of California, have invented certain new and useful Improvements in Product-Picking Nozzles, of which the following is a specification.

This invention relates to improvements in product picking nozzles and is particularly adapted for the picking of products where they are drawn in to a suitable point under the action of suction, such for instance, as picking cotton or other material which is taken directly from the plants.

It is an object of the invention to provide a product picker having one or more universal joints therein, whereby the intake end of the device may be presented in different directions for reaching the materials picked with greater facility.

It is also an object of the invention to provide a cotton or other product picking nozzle mechanism with a valve mechanism under the control of the operator for preventing the entrance of leaves and foreign substances which tend to clog or retard the passage of the materials through the nozzle.

It is a further object of the invention to provide a nozzle for a harvesting device with tubular sections, having universal joints therein, interposed between the sections and having internally arranged shutters for controlling the passage of the materials through the nozzle, whereby the clogging of the same at the entrance of the nozzle may be prevented.

It is a still further object of the invention to provide a product picking nozzle having a valve mechanism therein, and having a removable end piece adapted to contract the opening at the entrance to said nozzle.

With these and other objects in view, the invention comprises certain novel constructions, combinations and arrangements of parts as will be hereinafter more fully described and claimed.

In the accompanying drawing forming a part of this specification:

Figure 1 is a longitudinal central sectional view through a nozzle constructed in accordance with this invention.

Fig. 2 is a view partially in section and partially in side elevation extending from the inlet end of the nozzle to a point beyond the shutter or valve carrying joint of the device, the section being taken at right angles to the plane of the section in Fig. 1.

Fig. 3 is a sectional view similar to that of Fig. 1, taken through the valve or shutter carrying joint of the nozzle device, but showing the shutters or valve mechanism in closed position.

Fig. 4 is a detail sectional view taken upon the line 4—4 of Fig. 1.

Fig. 5 is a detail in end elevation of the tip or end piece mounted at the inlet end of the nozzle.

Fig. 6 is a detail sectional view through the end picker section showing a valve having only one shutter.

In picking or harvesting certain kinds of vegetable products, and especially such as grow upon plants, bushes, or the like, as cotton, it has been common to employ a suction applied to hollow piping for drawing the materials off of the plant or bush and depositing it in a suitable receptacle under the action of suction produced in any desired way. In using machines of this kind, it has been found necessary to employ a suitable nozzle mechanism, which may be presented or applied to the product, whereby the suction will draw the same into the nozzle and pass it on through the machine. The device of the present invention is designed to afford a superior nozzle device for this purpose, and one in which the entrance of leaves, twigs, or foreign substances may be prevented by a suitable valve or controlling shutter, the device also having a universal joint section for facilitating the turning of the nozzle toward the product to be gathered.

In the accompanying drawing, the preferred type of a nozzle mechanism has been illustrated, in which 5 indicates the end of a suction pipe, 6 an intermediate movable section, 7 and 8 universal joints, and 9 an end or inlet nozzle piece. The suction pipe 5 is preferably of flexible material, such for instance, as rubber tubing and leads to any suitable suction producing mechanism, as for instance, a blower or suction fan, whereby the contents of said pipe may be exhausted for tending to draw material into and through said pipe. Mounted in the end of the suction pipe 5, is a universal joint member 10, having a hollow approximately spherical portion with a neck portion 11 projecting therefrom and extending into the end of the said pipe 5. An outer securing strip or band 12 may be secured around the portion of the pipe 5, which receives the said neck 11 in order to bind the parts together. The spherical portion 10 is provided with an opening 13 opposite the aperture within the neck 11.

One end of the intermediate nozzle section 6 has a movable connection with the spherical portion 10 of the universal joint, and the end of the said intermediate section 6 is flared outwardly at 14 and given a proper curvature to fit closely the spherical exterior of the outer surface of the portion 10.

A ring member 15 also fits upon the said spherical portion and is provided with an internally threaded flange 16 adapted to be screwed upon the exteriorly threaded portion of the outwardly flared edge 14 of the section 6. The securing spherical fitting bearing afforded by the end of the member 6 and the ring 15, may thus be separated so as to be removable from the said spherical portion 10. The outer end of the intermediate section 6 is also provided with a partially spherical shaped flaring end adapted to fit upon and move above a partially spherical end portion 17 formed upon the outer nozzle section 9. A ring 18 having a screw threaded flange 19 is adapted to be screwed upon the said spherical portion 17, engaging exterior threads on the outwardly flared edge portion 20 of the intermediate section 6. The sections of the nozzle are thus connected by two universal joints of the ball and socket type, and the outer section of the nozzle may thus be bent to one side, at least to an angle of forty-five degrees or thereabout, with respect to the end of the pipe 5, so that a suitable range of movement is thus provided for and the outer nozzle section 9, which is grasped by the hand of the operator may be easily turned in any direction radially, with respect to the said suction pipe 5. Of course, it will be understood that the range of movement in the nozzle section may be increased by increasing the extent of the spherical or ball portions of the spherical joints within the scope of the invention.

The outer end of the section 9 is open and is usually fitted with a telescoping end piece 21, having an inturned outer edge portion 22, preferably provided with inwardly projecting points or teeth 23. The inturned edge portion with the teeth thereon is curved inwardly to a slight extent as clearly shown in Fig. 1. The cap or end piece 21 is preferably provided with two or more bayonet joints 24, whereby it can be held in place on the end of the nozzle section 9, the pin 29 of each joint being usually carried by said section 9, while the angular slots 26 are formed in said cap or end piece 21. The opening in the cap piece which is surrounded by the teeth 23, thus reduces the size of the inlet opening of the nozzle, so that the incoming column of air is contracted at this point and caused to increase its velocity in crowding through the opening. The said opening is of smaller diameter than the interior of the nozzle section 9 for this purpose.

The nozzle is provided with an interior valve or shutter mechanism, whereby the inflow of air and materials may be checked or controlled as desired. This valve mechanism preferably consists of one or more shutters 27 and 28, mounted substantially within the spherical portion 17 of the pipe section 9. The shutters are preferably hinged together at opposite sides as at 29. The said shutters being made to fit within the spherical walls of the portion 17 as clearly shown in the drawing. When the said shutters open, they recede into the spherical portion of the walls 17 as shown in Figs. 1 and 2 of the drawing, thus leaving an opening through the ball joint of the same size as the adjacent diameter of the nozzle section 9. The spherical shutters 27 and 28 may be drawn together as shown in Fig. 3 of the drawing for checking or cutting off any flow of air and other materials through the nozzle as will be readily understood.

The shutters are connected with rods 30 and 31, one of which extends to the shutter 27 and the other shutter 28. The said rods are arranged to extend closely along the sides of the section 9 and spread at their inner ends to engage the shutters near their pivotal points, so as to offer no appreciable obstruction to the cotton or other foreign substances which pass through the nozzle. The rods 30 and 31 are connected with a yoke shaped end portion 32 of a lever 33, having an outwardly projecting handle 34 outside the nozzle section 9 by which the lever is operated. The yoke 32 moves inside the said section 9 and conforms closely to the inner curvature of its walls. The ends of the said yoke portion 32 are pivotally connected with the ends of the rods 30 and 31, so that by pressing upon the lever 34 with a thumb or finger, the shutters may be drawn together, and the valve closed. A spring 35 mounted between the end of the lever handle 34 and the adjacent wall of the nozzle section 9 normally presses the handle outwardly and when said handle is released opens the shutters. The lever 33 is pivoted between lugs 36 arranged upon each side of an opening or slot 37 in the section 9 through which the lever passes. The opening or closing of the valve or shutter mechanism, is thus under the control of the hand of the operator. Sufficient recesses or notches as at 38 are left in the edges of the said shutters to accommodate and fit over the rods 30 and 31 when the shutters are closed, thus permitting a close fitting of the shutters together for cutting off the suction through the nozzle. A valve mechanism has been found necessary in picking or harvesting certain kinds of products, where leaves and other foreign substances are likely to be drawn against the nozzle entrance opening and thus clog the same. By closing the shutter at such times long enough to normally cut off the suction, such leaves and foreign materials will drop from the end of the nozzle out of the way, and the shutter may be opened again for continuing the operation of picking or harvesting the cotton or other materials. Without a shutter mechanism in the nozzle, it is practically impossible to pick cotton or other substances any length of time before, the leaves or broken bolls, and other substances will clog the entrance to the nozzle and prevent the drawing in of the said cotton or other materials. The nozzle mechanism is also found important, in that it can be closed and the suction cut off when the nozzle is withdrawn from the cotton boll and moved to another, for if the nozzle is left open when it is moved about through the branches and leaves, it will draw in the leaves and branches and everything near it, so as to tend to clog it and tend to mix broken leaves and twigs with the cotton. With the device of the present invention, it is only necessary to permit the valve to open when the nozzle is brought to each individual boll, at which time the attendant presses upon the handle 34. The device of the present invention is admirably adapted for the purpose desired and obviates the difficulty heretofore experienced in this respect.

It will be understood that a single shutter of a little greater width could be used instead of two shutters, for the wider shutter would reach entirely across the opening in the nozzle section. This and other minor details of the device may be altered or modified in size or shape, without departing in the least from the spirit of the invention.

As shown in Fig. 6 of the drawing, a single shutter 39 is illustrated and mounted within the spherical portion of the nozzle section 9. The shutter 39 is formed with a projection 40 extending beyond one of the pivotal points 41 on one side of the nozzle, and an operating rod 42 is connected therewith for moving the shutter back and forth in opening or closing the nozzle. The rod 42 may be connected with a lever similar to the lever 33 shown in Fig. 1 of the drawing. When the rod 42 is pulled upon, the shutter will be swung across the inner open end of the nozzle section 9 as indicated in dotted lines in Fig. 6. The operation of the device is substantially the same with one shutter as with two. It will thus be evident that the mechanism may be modified in its details within the scope of the invention.

What is claimed is:

1. A picker nozzle comprising hollow sections having hollow universal joints connecting the same, a valve mechanism mounted in one of the joints, and means extending outside the nozzle for controlling the valve mechanism.

2. A cotton picker nozzle comprising spherically jointed hollow nozzle sections adapted to be turned in any direction, shutters mounted in one of said joints and adapted to be drawn together for cutting off the suction through the nozzle and a hand operated lever for moving said shutters.

3. A product picking nozzle having hollow articulating sections with telescoping ends, pivoted shutters fitting within the inner end of the inner section, rods extending from said shutters, a yoke shaped lever connected with said rods adapted to operate said shutters, and a spring adapted to normally move said lever to open the shutters, said lever being adapted for operation to close said shutters temporarily to cut off the suction through the nozzle.

4. A cotton picking nozzle comprising a plurality of tubular sections having a spherically shaped joint removably held together, a pair of coöperating and simultaneously operable shutters mounted therein for closing the passage to the nozzle, and means exterior of said nozzle and connected with said shutters, whereby the shutters may be opened and closed at will.

In testimony whereof we have hereunto set our hands in presence of two witnesses.

HALL H. HOLDAWAY.
THOMAS RING GABEL.

Witnesses:
  D. P. KENDRICK,
  CASSELL SEVERANCE.